United States Patent [19]

Bergh

[11] Patent Number: 4,766,951
[45] Date of Patent: Aug. 30, 1988

[54] RADIANT, LINEAR PANELS

[76] Inventor: Thomas R. Bergh, 851 Brown, Elmhurst, Ill. 60126

[21] Appl. No.: 945,816

[22] Filed: Dec. 24, 1986

Related U.S. Application Data

[63] Continuation of Ser. No. 681,100, Dec. 13, 1984, abandoned.

[51] Int. Cl.$^4$ .................. F24H 9/06; F24D 19/02
[52] U.S. Cl. ....................... 165/56; 165/49; 165/171; 237/69
[58] Field of Search ............. 165/56, 49, 171; 237/69

[56] References Cited

U.S. PATENT DOCUMENTS

| | | | |
|---|---|---|---|
| 2,660,409 | 11/1953 | Pittenger et al. | 165/56 |
| 2,662,743 | 12/1953 | Frenger | 165/56 |
| 2,751,198 | 6/1956 | Rapp | 237/69 |
| 3,043,567 | 7/1962 | Bergh et al. | 165/49 |
| 3,143,637 | 8/1964 | Rifenbergb | 165/49 |
| 3,246,120 | 4/1966 | Brandenburg | 165/171 |
| 3,305,003 | 2/1967 | Rothschild | 165/171 |
| 3,366,170 | 1/1968 | Welz | 237/69 |
| 4,080,703 | 3/1978 | Beck, Jr. | 165/171 |
| 4,338,995 | 7/1982 | Shelley | 165/76 |
| 4,363,082 | 12/1982 | Roland | 362/225 |
| 4,635,710 | 1/1987 | Shelley | 165/56 |

FOREIGN PATENT DOCUMENTS

| | | | |
|---|---|---|---|
| 235459 | 12/1959 | Australia | 165/171 |
| 730361 | 3/1966 | Canada | 165/171 |
| 2520467 | 11/1976 | Fed. Rep. of Germany | 165/49 |
| 1430292 | 1/1966 | France | 165/49 |
| 2456908 | 1/1981 | France | 165/122 |
| 1223182 | 2/1971 | United Kingdom | 165/49 |

OTHER PUBLICATIONS

Extrusions (drawing)—Jun. 6, 1978.
*Airtex's Architectural Space Master Series* (p. 8, FIG. 26999).

Primary Examiner—Albert W. Davis, Jr.
Assistant Examiner—John K. Ford

[57] ABSTRACT

A linear panel unit for use on walls or ceilings capable of providing radiant heating and/or cooling. The panels have an external panel shell, which itself can be used as a passive panel, an extruded aluminum radiator panel resting in the shell with outward side in contact with the shell and an inward side in contact with a copper tube capable of containing fluids of varying temperature. Clips between bilateral troughs in the sidewall of the panel shell and the inward side of the radiator panel secure contact between radiator panel and the shell. The copper tube is grasped by projecting channel walls in the inward side of the radiator panel which also are tapered to facilitate positioning of the clips and a groove near the intersection with the radiator panel to secure placement of the clip. A panel unit wall or ceiling is created by interspersing radiant linear panels with identically appearing passive panel shells, the copper tubes of the active radiant panel units communicating with one another.

7 Claims, 1 Drawing Sheet

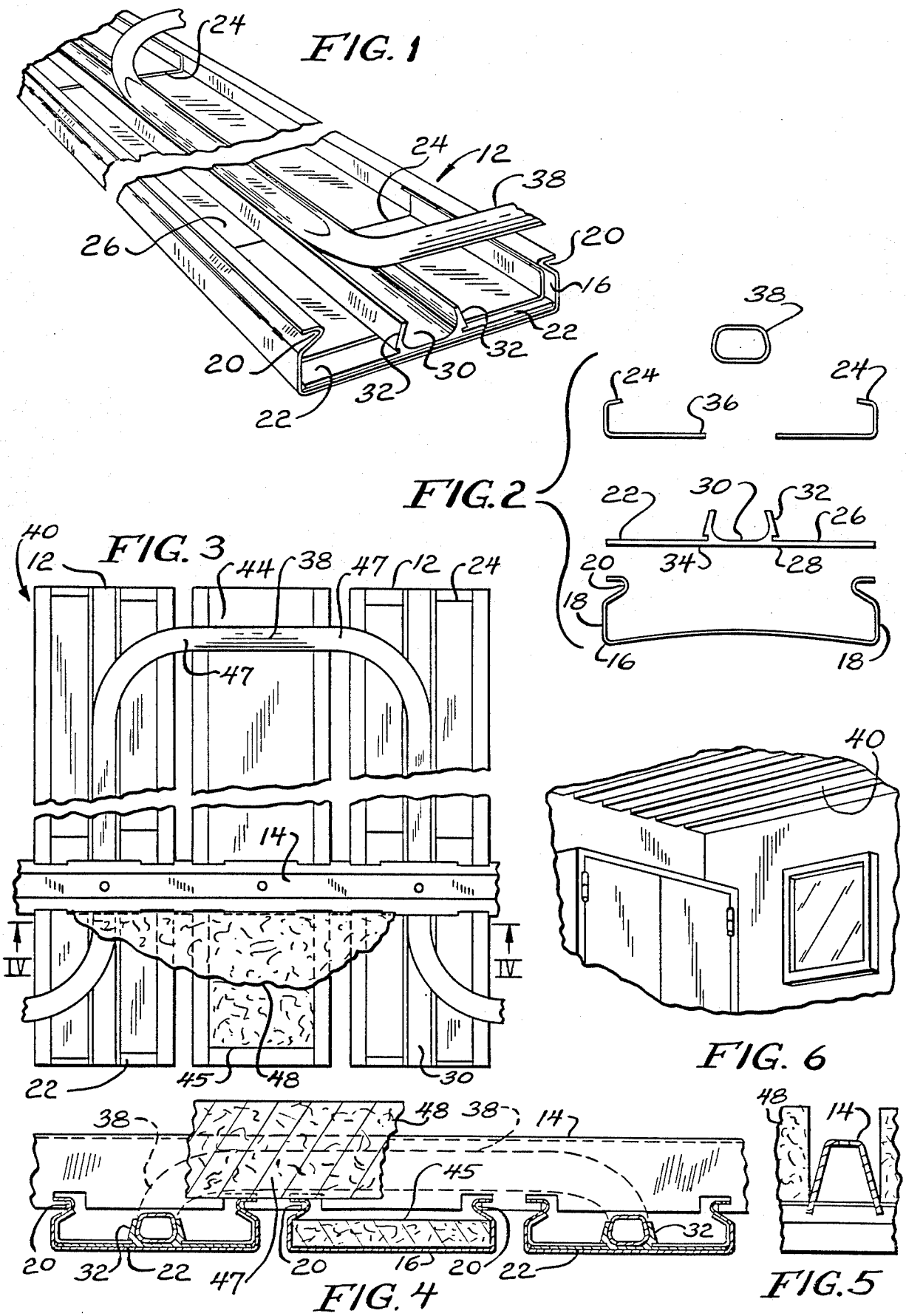

RADIANT, LINEAR PANELS

This is a continuation of application Ser. No. 681,100 filed Dec. 13, 1984 now abandoned.

BACKGROUND OF THE INVENTION

The present invention relates generally to ceiling and wall coverings and, more particularly to ceiling and wall panels which are capable of radiant heating and cooling.

A recent advance in panel systems for ceilings and walls utilized heating or cooling panels to provide radiant heating or cooling of objects in a room. In particular, pipes forming water circulating tubes were fastened or metallurgically bonded to the hidden (inward) side of the panels (see, for example, U.S. Pat. No. 4,338,985 issued to Shelley and U.S. Pat. No. 4,080,703 issued to Beck). Heat is transferred between the water circulating in the tubes and the panel, which, in turn, act to radiate or absorb heat. Standard modulating controls send heated or cooled water into the tubes upon the command of room thermostatic sensors and the resultant heating or cooling action results almost immediately. Such a system complements a common air circulating heating or air-conditioning system, providing comfortable heat exchange directly with all physical bodies in a room. Energy is saved and drafts reduced.

In the past, large square and rectangular radiant panels have been constructed to cover a ceiling or wall. Also in the past, linear panels have been mounted on carrier bars on ceilings and walls to produce a very pleasing appearance as well as to provide additional thermal and/or acoustic insulation to a room. Never before have linear panels been combined with the concept of radiant heating.

It is very desirable to combine the advantages of a radiant paneled ceiling with the appearance and thermal/acoustic benefits of a linear paneled wall or ceiling. Unfortunately, construction of a radiant, linear panel created many problems. For example, variations in temperature created warping or other disfigurement of the visible side of the panel, caused in part to the greatly disproportionate length and width dimension of the linear panel. Construction of a linear panel with every panel being a radiant panel was very expensive and not as efficient as interspring active radiant, linear panels with passive linear panels. This side-by-side mounting of active and passive linear panels created additional problems in matching the appearance of the radiant panels with the passive panels. Paint colors would be very difficult, if not impossible, to match when applied on different surfaces. Further, variations in the temperatures of the radiant panels resulted in color changes over time which would not occur in adjacent passive linear panels.

The object of the present invention is to provide a usable radiant, linear panel.

An additional object of the present invention is to provide a radiant linear panel and a radiant linear panel system for covering a ceiling or wall overcoming the previously discussed problems.

Other objects of the invention are apparent from the following description of the preferred embodiment.

SUMMARY OF THE INVENTION

The present invention provides a linear panel unit for use on walls or ceilings capable of providing radiant heating or cooling. The radiant, linear panel unit utilizes an outwardly visible panel shell having bilateral sidewalls and for mounting the unit on carrier bars placed on a wall or ceiling. An aluminum extruded radiator panel rests in the panel shell and is secured with outward surface in contact with the panel shell with flexible clips positioned between the recesses and the inward surface of the radiator panel. The inward side of the radiator panel also has a channel which grasps a copper flow tube capable of containing fluids of varying temperature. Heat is conducted between the fluid in the flow tube, the flow tube, the radiator panel and, ultimately, the panel shell. This construction avoids warping or other disfigurement of the panels resulting from thermal stress.

A panel system covering an entire ceiling or wall utilizes interspersed active radiant panels with passive panels comprising a panel shell and, in some cases, an acoustic element resting in the shell. The active panels are indistinguishable from the passive panels, creating a desirable uniform appearance not otherwise obtainable. The flow tubes of active panels communicate with tubes of adjacent active panels and a thermal and/or acoustic blanket can be laid behind the linear panels or carrier bars to provide noise absorption and insulation and finished appearance.

BRIEF DESCRIPTION OF THE DRAWINGS

FIG. 1 is a perspective view of the preferred embodiment of the panel unit;

FIG. 2 is an exploded view of the panel unit shown in FIG. 1;

FIG. 3 is a planar view of the inward side of three panels, two active radiant panels with a passive panel between them, mounted on a carrier bar;

FIG. 4 is a cross-sectional view of the three panels shown in FIG. 3 taken on section line 4—4;

FIG. 5 is a cross-sectional view of part of the carrier bar with a panel unit attached; and FIG. 6 is a perspective view of the panel system mounted on a ceiling.

DESCRIPTION OF THE PREFERRED EMBODIMENT

Referring to FIGS. 1 through 6, the preferred embodiment of the present invention includes a radiant, linear panel 12 hung on carrier bars 14 (shown in FIGS. 3-5). The panel unit 12 is made up of a panel shell 16 having sidewalls 18 recesses formed by an essentially U-shaped or V-shaped flange at the upper ends of the side walls 18 and 20 running longitudinally along each side of the panel shell. A radiator panel 22 rests in the panel shell 16 and is secured in contact with the panel shell by a flexible clip 24 having a generally planar side with an arcuate end at one extremity thereof, which is wedged between recesses 20 formed by an essentially C-shaped flange at the upper ends of the sidewalls 18 and the inward surface 26 of the radiator panel.

Contact between the outward surface 28 and the panel shell is important for high thermal efficiency of the preferred embodiment. Studies indicate about 70% thermal efficiency when the shell is not in flush contact with the panel but about 98% efficiency when a high level of contact between the two is achieved. To accomplish this, the panel shell 16 is curved in a concave manner so that it presses against the outward surface 28 of the radiator panel 22. The flexible clips put pressure on the edge of the panel shell 16, which is somewhat flexible, to make contact with the edges of the outward surface of the radiator panel. The bottom of the panel shell, when placed in forceable contact with the radiator panel, is flat. Alternatively, of course, it is contemplated that close contact between the radiator panel and the shell can be accomplihed without curvature in the shell, by flat surface to flat surface connection or by any other method to accomplish surface contact known in the art.

The inward side 26 of the radiator panel 12 is formed into a longitudinally extending C-shaped channel 30 defined by channel walls 32. The channel walls contain a longitudinally extending groove 34 near or at its intersecton with the inward surface 26 of the radiator panel. The groove holds the distal end 36 of the clip 24 so that the clip lays flat against the inward surface 26 of the radiator panel 22.

The channel walls 32 are tapered on the sides facing the sidewalls 18 of the panel shell to deviate away from the sidewalls as the distance from the inward surface of the radiator panel increases. The groove 34 facilitates easy insertion of the clip 24 by first placing the distal end 36 of the clip in the groove 34 before snapping the curved end of the clip against sidewall 18 of the panel shell. This tapering of the channel walls 32 facilitates the alternate method of inserting of the clip 34 in the device of first placing the curved end against the sidewall 18 of the panel shell and then pressing the distal end 36 of the clip down against the tapered side of the channel wall 32 until the clip 24 is flat against the radiator panel 22, when the distal end snaps into the groove 34.

A copper flow tube 38 is grasped by the C-shaped channel 30 and runs almost the entire length of the panel, deviating from and curving up and out of the channel near its end. Contact between the tube 38 and the radiator panel 22 is important to maximize conductive heat exchange between water in the tube and the radiator panel and, ultimately, the panel shell. The tube can be inserted into the channel and then deformed to press its sides against the sides of the C-shaped channel 30. Of course, the invention contemplates that other variations of inserting the tube and obtaining maximum contact between the tube and channel are known in the art and may be utilized for purposes of this invention.

Although copper is the preferred material from which to construct the tubing due to its excellent heat conductive and non-corrosive properties, the invention can utilize any type of tubing able to conduct heat from fluids of varying temperatures. Metals and other materials suitable for use are presently known in the art and may be substituted for the copper tube.

Similar considerations are made for choosing the materials appropriate for the radiator panel 22, panel shell 16, and clip 24. The radiator panel 22 is preferably an aluminum extrusion having good heat conductive properties and also being sturdy enough to support the flattening of the panel shell. The panel shell is preferably constructed of a thin, flexible aluminum or steel sheet, also with good conductive properties and colored with dye, enamel or other type of paint. The flexible clip is preferably made of thin aluminum which is deformable for placement in the device and which also places adequate pressure on the panel shell against the radiator panel. Use of aluminum for the radiator panel, panel shell and clip is preferred to obtain corrosion compatibility. However, the invention contemplates use of other materials known in the art which have properties suitable for construction of any of these three pieces.

The preferred combination of copper tube, aluminum radiator panel and enameled sheet metal shell produces an advantage of negligible warping of the panels over variations in temperature. Also, other seriously objectionable visible distortions, such as the oil-can effect, are avoided by the attachment arrangement of the parts. As mentioned earlier, these were problems expected to be encountered especially in linear panels which may be as long as 40 feet, while only four inches in width.

Referring now specifically to FIGS. 3-6, a panel system is designated generally as 40 which encompasses a series of panels mounted on and supported by carrier bars 14, covering the ceiling. Of course, a wall or other suitable surface also could be covered by the inventive panel system.

The radiant panel units 12 are alternated on the mounting with passive linear panels 44 consisting only of the panel shell 16 and, optionally, an acoustic element 45 lying in the panel shell 16. The acoustic element 45 may be used for visual effect (if the shell is permeated) or acoustic or thermal insulation.

The passive linear panels are identical to the panel shells used in the accompanying radiant panels, except that the shells for the passive panels are flat along their bottom surface to appear indistinguishable to the shells in the radiant linear panels, which are flattened from the concave form by the radiator panel 22. This uniformity of appearance is a significant advantage of the invention which does not require every panel in the system to be an active panel. In fact, active panels can be alternated with passive panels or two or more passive panels can be placed between adjacent active radiant panels. No variation in a uniform panel system covering a wall is seen because all the panels, whether active or passive, appear identical.

The inward side of the panel system, shown in FIG. 3 in an alternating active-passive panel arrangement, has copper flow tubes 38 of radiant panels 12 communicating with tubes of adjacent active panels 12 near the ends of the panel, where the tube deviates from the channel 30. Flow of hot or cold fluids is carried through the tubes 38 to active panels which act to carry heat to (in the case of hot or warm water) or to carry heat away from (in the case of cool or cold water) the radiator panels 22 in contact with the tubes. Arrangements of connections between panels, other than between adjacent panels (such as a row feed from a main conduit) are contemplated by the invention.

To avoid the unsightly view of tubes in the spaces, the copper flow tubes 38 may be painted at visible points 47 to match the color of the panel shells, or black to hide them in the darkness behind the shells and to match a black insulation blanket, if used.

The preferred embodiment of the panel system utilizes panels of about 3½ inch width, separated by about ½ inch. Consequently, the supporting ceiling or wall could be viewed in the ½ inch space between the panels. The appearance, thermal and/or acoustic qualities of the system are improved by a thermal and acoustic insulation blanket 48 placed between the panel system and the ceiling. The blanket is visible through the half-inch spaces between the panels and provides additional thermal or acoustic insulation as well as a pleasing appearance, hiding the supporting ceiling or wall.

Alternatively, of course, the panels can be placed flush against one another, thereby eliminating the spaces between the panels. An insulation blanket 48 would still provide desired thermal and/or acoustic insulation.

Although the invention has been described in terms of a specific embodiment, it is contemplated that many alterations and modifications may be made to the disclosed embodiment without departing from the invention. Accordingly, it is intended that all such alterations and modifications be considered as within the spirit and scope of the invention as defined by the appended claims.

What is claimed is:

1. A linear panel unit capable of radiant heating and cooling for use on walls and ceilings, the panel unit being mounted on carrier bars and comprising:
    a panel shell having an upwardly deformed bottom portion and configured with recesses formed running longitudinally along each side of said panel shell, and mounted to and supported by the carrier bars;
    a radiator panel resting in and in intimate thermal contact with the panel shell, the radiator panel having substantially an entire outward surface abutting against and in intimate thermal contact with the panel shell and an inward surface containing an integral longitudinal channel;
    clip means positioned between the recesses in the panel shell and the inward side of the radiator panel to secure contact between the outer side of the radiator panel and the panel shell;
    the channel comprising two parallel, longitudinally extending walls projecting from the inward side of the radiator panel, wherein the panel shell has bilateral side walls, and wherein the clip means is wedged in place between one side wall of the panel shell and one channel wall;
    a flow tube positioned in, conforming to, and in intimate thermal contact along generally the full circumference and substantially along the entire length of the longitudinal channel, the flow tube providing means for conveying liquid of varying temperature; and
    the channel walls containing a groove near the intersection of the channel wall with the inward side of the radiator panel to hold one end of the clip means,
    whereby heat will be transferred between a fluid contained in the flow tube and the panel shell.

2. A linear panel unit capable of radiant heating and cooling for use on walls and ceilings, the panel unit being mounted on carrier bars and comprising:
    a panel shell having an upwardly deformed bottom portion configured with recesses formed longitudinally along each side of said panel shell, and mounted to and supported by the carrier bars;
    a radiator panel resting in and in intimate thermal contact with the panel shell, the radiator panel having substantially an entire outward surface abutting against and in intimate thermal contact with the panel shell and an inward surface containing an integral longitudinal channel;
    clip means positioned between the recesses in the panel shell and the inward side of the radiator panel to secure contact between the outer side of the radiator panel and the panel shell;
    the channel comprising two parallel, longitudinally extending walls projecting from the inward side of the radiator panel, wherein the panel shell has bilateral side walls, and wherein the clip means is wedged in place between one side wall of the panel shell and one channel wall;
    a flow tube positioned in, conforming to, and in intimate thermal contact along generally the full circumference and substantially along the entire length of the longitudinal channel, the flow tube providing means for conveying liquid of varying temperature;
    the channel walls containing a groove near the intersection of the channel wall with the inward side of the radiator panel to hold one end of the clip means; and
    said clip means comprising a flexible hook-shaped clip having one end wedged against the groove and the opposite end wedged against the side wall between the panel shell trough and the inward side of the radiator panel,
    whereby heat will be transferred between a fluid contained in the flow tube and the panel shell.

3. A linear panel unit capable of radiant heating and cooling for use on walls and ceilings, the panel unit being mounted on carrier bars and comprising:
    a panel shell having an upwardly deformed bottom portion and configured with recesses formed longitudinally along each side of said panel shell, and mounted to and supported by the carrier bars;
    a radiator panel resting in and in intimate thermal contact with the panel shell, the radiator panel having substantially an entire outward surface abutting against and in intimate thermal contact with the panel shell and an inward surface containing an integral longitudinal channel;
    clip means positioned between the recesses in the panel shell and the inward side of the radiator panel to secure contact between the outer side of the radiator panel and the panel shell;
    the channel comprising two parallel, longitudinally extending walls projecting from the inward side of the radiator panel, wherein the panel shell has bilateral side walls, and wherein the clip means is wedged in place between one side wall of the panel shell and one channel wall;
    a flow tube positioned in, conforming to, and in intimate thermal contact along generally the full circumference and substantially along the entire length of the longitudinal channel, the flow tube providing means for conveying liquid of varying temperature;
    said channel walls containing a groove near the intersection of the channel wall with the inward side of the radiator panel to hold one end of the clip means; and
    said clip means comprising a flexible hook-shaped clip having one end wedged against the groove and the opposite end wedged against the side wall between the panel shell trough and the inward side of the radiator panel;
    the side of the channel walls facing the panel shell side walls are tapered away from the side wall to facilitate placement of the hook-shaped clips,
    whereby heat will be transferred between a fluid contained in the flow tube and the panel shell.

4. A linear panel unit capable of radiant heating and cooling for use on walls and ceilings, the panel unit being mountable on carrier bars and comprising
    a panel shell having an outward side, side walls, and recesses formed at the upper ends of the side walls and running longitudinally along each side of each panel shell and mounted to and supported by the carrier bars;

an aluminum radiator panel resting in and in intimate thermal contact with the panel shell, the radiator panel having an outward surface abutting against and in intimate thermal contact with the panel shell substantially along the entire width and length of the panel shell, and having an inward surface containing an integral longitudinal C-shaped channel, defined by two parallel, longitudinally extending walls projecting from the inward side of the radiator panel, each wall of the channel being tapered away from the panel shell side walls and having a groove near the intersection of each channel wall in the radiator panel;

a copper flow tube partially, rigidly grasped by and abutting against the channel, and in intimate thermal contact with the longitudinal walls of the channel along substantially their entire length and circumference, the flow tube providing means for conveying liquid of varying temperatures; and a flexible clip positioned with one end in the groove in the channel wall and the opposing end wedged between the panel shell trough and the inward side of the radiator panel to secure contact between the outward side of the panel and the panel shell;

whereby heat will be transferred between the fluid contained in the flow tube and the panel shell.

5. A linear panel system capable of radiant heating and cooling for use on walls and ceilings, the system being mountable on carrier bars and comprising:

a plurality of active linear panel units having a panel shell with an upwardly deformed bottom portion and further having side walls configured with recesses running longitudinally along each side of said panel shell mounted on and supported by the carrier bars;

a radiator panel resting in and in intimate thermal contact with the panel shell with an outward surface abutting against and in intimate thermal contact with the panel shell substantially along the entire width and length of the outward surface and having an inward surface forming an integral longitudinal channel;

a flow tube positioned in, conforming to, and in intimate thermal contact with walls of the longitudinal channel along substantially their entire length and circumference, the flow tube providing means for conveying liquids of varying temperature;

a plurality of passive linear panel units mounted on the carrier bars, the passive units being interspersed with the active linear panel units, each passive linear panel unit being comprised of a panel shell configured with recesses running longitudinally along each side of said panel shell for mounting and supporting the passive panel unit on the carrier bar;

each of said active linear panel units further comprising clip means between the recesses on the panel shell and the inward side of the radiator panel to secure contact between the outward side of the radiator panel and the panel shell;

said channels comprising two parallel longitudinally extending walls projecting from the inward side of the radiator panel, wherein the panel shell of each active panel unit has bilateral side walls, and wherein the clip means is wedged in place between the side wall of the panel shell and the channel wall;

said channel wall containing a groove near the intersection of the channel wall with the inward side of the radiator panel to hold one end of the clip means;

whereby the active panel units capable of providing radiant heating and cooling are indistinguishable from the passive panel units.

6. A linear panel system capable of radiant heating and cooling for use on walls and ceilings, the system being mountable on carrier bars and comprising:

a plurality of active linear panel units having a panel shell with an upwardly deformed bottom portion and further having side walls configured with recesses running longitudinally along each side of said panel shell mounted on and supported by the carrier bars;

a radiator panel resting in and in intimate thermal contact with the panel shell with an outward surface abutting against and in intimate thermal contact with the panel shell substantially along the entire width and length of the outward surface and having an inward surface forming an integral longitudinal channel;

a flow tube positioned in, conforming to, and in intimate thermal contact with walls of the longitudinal channel along substantially their entire length and circumference, the flow tube providing means for conveying liquids of varying temperature;

a plurality of passive linear panel units mounted on the carrier bars, the passive units being interspersed with the active linear panel units, each passive linear panel unit being comprised of a panel shell configured with recesses running longitudinally along each side of said panel shell for mounting and supporting the passive panel unit on the carrier bar;

each of said active linear panel units further comprising clip means between the recesses on the panel shell and the inward side of the radiator panel to secure contact between the outward side of the radiator panel and the panel shell;

said channels comprising two parallel longitudinally extending walls projecting from the inward side of the radiator panel, wherein the panel shell of each active panel unit has bilateral side walls, and wherein the clip means is wedged in place between the side wall of the panel shell and the channel wall;

said channel wall containing a groove near the intersection of the channel wall with the inward side of the radiator panel to hold one end of the clip means; and the clip means comprises a flexible hook-shaped clip having one end wedged against the groove and the opposite end wedged against the side wall between the panel shell trough and the inward side of the radiator panel;

whereby the active panel units capable of providing radiant heating and cooling are indistinguishable from the passive panel units.

7. A linear panel system capable of radiant heating and cooling for use on walls and ceilings, the system being mountable on carrier bars and comprising:

a plurality of active linear panel units having a panel shell with an upwardly deformed bottom portion and further having side walls configured with recesses running longitudinally along each side of said panel shell mounted on and supported by the carrier bars;

a radiator panel resting in and in intimate thermal contact with the panel shell with an outward surface abutting against and in intimate thermal contact with the panel shell substantially along the entire width and length of the outward surface and having an inward surface forming an integral longitudinal channel;

a flow tube positioned in, conforming to, and in intimate thermal contact with walls of the longitudinal channel along substantially their entire length and circumference, the flow tube providing means for conveying liquids of varying temperature;

a plurality of passive linear panel units mounted on the carrier bars, the passive units being interspersed with the active linear panel units, each passive linear panel unit being comprised of a panel shell configured with recesses running longitudinally along each side of said panel shell for mounting and supporting the passive panel unit on the carrier bar;

each of said active linear panel units further comprising clip means between the recesses and the panel shell and the inward side of the radiator panel to secure contact between the outward side of the radiator panel and the panel shell;

said channels comprising two parallel longitudinally extending walls projecting from the inward side of the radiator panel, wherein the panel shell of each active panel unit has bilateral side walls, and wherein the clip means is wedged in place between the side wall of the panel shell and the channel wall;

said channel wall containing a groove near the intersection of the channel wall with the inward side of the radiator panel to hold one end of the clip means;

the clip means comprises a flexible hook-shaped clip having one end wedged against the groove and the opposite end wedged against the side wall between the panel shell trough and the inward side of the radiator panel; and the side of the channel walls facing the panel shell side walls is tapered away from the side wall to facilitate placement of the hook-shaped clip, whereby the active panel units capable of providing radiant heating and cooling are indistinguishable from the passive panel units.

* * * * *

UNITED STATES PATENT AND TRADEMARK OFFICE
CERTIFICATE OF CORRECTION

PATENT NO. : 4,766,951

DATED : August 30, 1988

INVENTOR(S) : Thomas R. Bergh

It is certified that error appears in the above-identified patent and that said Letters Patent is hereby corrected as shown below:

Title page, the following should be inserted.

Assignee: Airtex Corporation, Chicago, Ill.

Signed and Sealed this

Seventh Day of February, 1989

Attest:

DONALD J. QUIGG

*Attesting Officer*  *Commissioner of Patents and Trademarks*